United States Patent [19]

Erdt et al.

[11] Patent Number: 4,684,303

[45] Date of Patent: Aug. 4, 1987

[54] DRILL STAND WITH A GUIDE COLUMN

[75] Inventors: Wolfgang Erdt; Rudolf Reitberger, both of Munich, Fed. Rep. of Germany; Erwin Stocker, Balzers, Liechtenstein

[73] Assignee: Hilti Aktiengesellschaft, Fürstentum, Liechtenstein

[21] Appl. No.: 777,026

[22] Filed: Sep. 17, 1985

[30] Foreign Application Priority Data

Sep. 17, 1984 [DE] Fed. Rep. of Germany ....... 3434075

[51] Int. Cl.[4] .............................................. B23B 45/14

[52] U.S. Cl. .................................... 409/235; 408/234; 408/712

[58] Field of Search ................. 408/76, 135, 136, 234, 408/712; 29/1 A; 384/7, 26, 31; 409/235

[56] References Cited

U.S. PATENT DOCUMENTS

| | | | |
|---|---|---|---|
| 734,082 | 7/1903 | Nutting | 408/136 |
| 1,940,443 | 12/1933 | Blood | 29/1 A X |
| 4,261,673 | 4/1981 | Hougen | 408/76 X |
| 4,300,271 | 11/1981 | Wohlhaupter | 29/1 A |

FOREIGN PATENT DOCUMENTS

| | | | |
|---|---|---|---|
| 1298838 | 7/1969 | Fed. Rep. of Germany | 408/234 |
| 3334753 | 6/1985 | Fed. Rep. of Germany . | |
| 1593242 | 7/1981 | United Kingdom | 408/136 |

*Primary Examiner*—Robert L. Spruill
*Assistant Examiner*—Steven P. Weihrouch
*Attorney, Agent, or Firm*—Toren, McGeady & Associates

[57] ABSTRACT

A drill stand includes a base plate, an elongated guide column extending outwardly from the base plate and a drilling device movably supported on the column. The guide column is formed of two laterally spaced elongated support members each having the same cross-section transversely of the elongated direction. A drilling device is positioned between the two support members. A rack is secured to the guide column and a feed mechanism for moving the drilling device includes a pinion in meshed engagement with the rack. Guide members on the support members fit into correspondingly shaped guide grooves on the drilling device.

7 Claims, 2 Drawing Figures

DRILL STAND WITH A GUIDE COLUMN

BACKGROUND OF THE INVENTION

The present invention is directed to a drill stand with a base plate, a guide column connected to the base plate and a drilling device movably supported on the guide column. The guide column and the drilling device have mutually engageable guiding means. A feeding mechanism for the drilling device is supported on the guide column.

In addition to stationary drilling machines used in the metal machining industry, drilling devices, as mentioned above, have been used for some time as mobile equipment in the construction industry. Such drilling devices are used mainly with diamond-tipped drill bits. With such drill bits it is possible to produce holes of larger diameter and also to cut the holes through steel reinforced concrete structures.

A significant problem associated with the drill stand for such drilling devices is the guidance of the device. Due to the overhang or cantilever of the drilling device required for the largest hole diameter and because of the forces exerted especially when larger tools are employed, high overturning moments can develop on the guides and great bending and torsion stresses occur in the guide column. As indicated above, these drilling devices must be movable and, if possible, handled by one or at most two people. Therefore, the guide column cannot be made arbitrarily heavy, since it would increase the overall weight of the drilling assembly.

In known drilling assemblies, the guide column has been U-shaped or C-shaped in transverse section. The drilling device is mounted inside the guide column. Since the drilling device is positioned within the guide column, the machining of the guides is very costly and usually requires special tools. Further, because of the cross-sectional shape involved, only the part of the drilling device which supports the drill spindle can project outwardly from the guide column, with the result that the feeding mechanism for the drilling device must also be located inside the guide column. As a consequence, an involved design including gearing, a threaded spindle and a threaded nut are required.

SUMMARY OF THE INVENTION

Therefore, it is a primary object of the present invention to provide an economical drill stand in which the guide column and the feeding mechanism are distinguished by a simple design.

In accordance with the present invention, the guide column is formed of two laterally spaced, parallel support members with each support member containing guides for the drilling device and with the column including means for engagement with the feeding mechanism.

As a result, the guide column is made up of two parts which can be produced and machined separately. Since the guides are freely accessible on the support members, it is possible to employ much larger and more economical metal working tools to machine the guides. One significant feature in the division of the guide column into two support members is that the column does not form a trough or receptacle for the large amount of coolant required in drilling hard receiving materials with diamond-tipped bits. When a wall is being drilled with the device embodying the present invention, the coolant can drain off between the two support members if the support members forming the guide column extend horizontally as two spaced beams. Further, the drilling device can project outwardly from the guide column not only on the drill spindle side but also on the opposite side. Accordingly, it is possible to locate the feeding mechanism on the outside of the guide column.

For limiting both weight and cost, light metal alloy sections produced by continuous casting or extrusion are preferred for the guide column. The die costs for forming such sections are relatively high. Therefore, for economical production it is preferred if the cross-section of the support members is identical. As a result, the fixed die costs can be distributed over twice the number of support member sections affording less costly production. Where possible, standard structural sections may also be used. Such sections are particularly advantageous, since they are produced in large quantities.

Primarily, the guide column is subjected to bending stresses. Such stresses act along the length of the support members. In addition, torsion stresses also act on the guide column. To absorb this combination of stresses, it is advantageous if the cross-section of the support members are essentially L-shaped. The shorter legs of the L-shaped sections may be quite short. If necessary, the L-shaped section can also be provided with additional reinforcing ribs. Since the same drilling device must be able to cut through thin as well as thick walls, ceilings and floors, it is required that the guide column is relatively long. Constructing the guide column from two individual support members leaves the possibility that the free ends of the support members may bend toward or away from one another. To prevent such an occurrence, it is preferable if the ends of the support members, spaced outwardly from the base plate, are interconnected by a cover plate. The cover plate may be bolted, riveted or welded to the free ends of the support members. In addition to interconnecting the support members, the cover plate also affords another function in that it limits the travel of the drilling device upwardly on the guide column and prevents any accidental movement out of the guide column.

The guides in the guide column must absorb forces acting in different directions. To effect such force absorption it is advantageous to form the guide as dovetail-shaped strips in engagement with correspondingly shaped recesses on the drilling device. With dovetail-shaped guides it is possible to adjust the operating clearance in a relatively simple manner. Since the guides are readily accessible because of the two-part construction of the guide column, the guide strips can be machined by cutting tools.

The wear in the guides in apparatus for drilling rock is relatively great. Such wear increases the tolerance in the guides. If the tolerance or clearance should become too great, effective operation is no longer possible and the tolerances must be eliminated. The elimination can be effected, for instance, by adjustable guides. Providing adjustment for the proper tolerances, however, is a very time-consuming operation and usually cannot be performed by the machine operator. One expedient solution is to provide the guide recesses in detachable members on the drilling device. If wear becomes excessive, the guide recesses can be simply replaced with new properly fitted guide recesses. As a result, time-consuming adjustments are avoided. It is also possible to make the elements forming the guide grooves or recesses from a plastics material with good sliding properties, such as polyamide (NYLON), polytetrafluor ethylene (TEFLON) or the like. Such plastics materials have a certain elasticity so that they can adapt to the guides on the support members.

Since the guide column is shaped so that it is open on two opposite sides, the drilling device can project out of the guide column on the side opposite the drilling spindle. Accordingly, it is possible to position the drive for the movable drilling device on the outside of the guide column. In one advantageous arrangement, the engagement means for the feeding mechanism for the drilling device is formed as a rack on the column. Using a feeding mechanism in combination with a rack affords the use of standardized components. If the length of the drilling stand according to the present invention is to be changed, such as by the extension or replacement of the guide column, the rack can be used again and can also be extended. Further, racks can be purchased in standard lengths and appropriately adapted to the length or height of the guide column.

The connection between the drilling device and the rack may be in the form of a worm shaft. Such a feeding mechanism is usually self-locking. The significant feature of such an arrangement is, regardless of the position of the guide column, that the drilling device automatically remains in position. A disadvantage of such a feeding mechanism is that the transmission ratio is very great, particularly for the return travel and then forward travel into the drilling position, for example for the removal of the drilled core, can be very time-consuming. Therefore, it is preferable for the simplified handling of the feeding mechanism to provide a drive shaft with a pinion. The pinion can mesh with the rack continuously and be driven, for example, manually by a handwheel or by a motor. If the feeding mechanism is operated manually, the drive shaft can be equipped with a driving connection at its opposite ends so that the handwheel can be applied to either one of the ends, depending on the position of the drilling device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
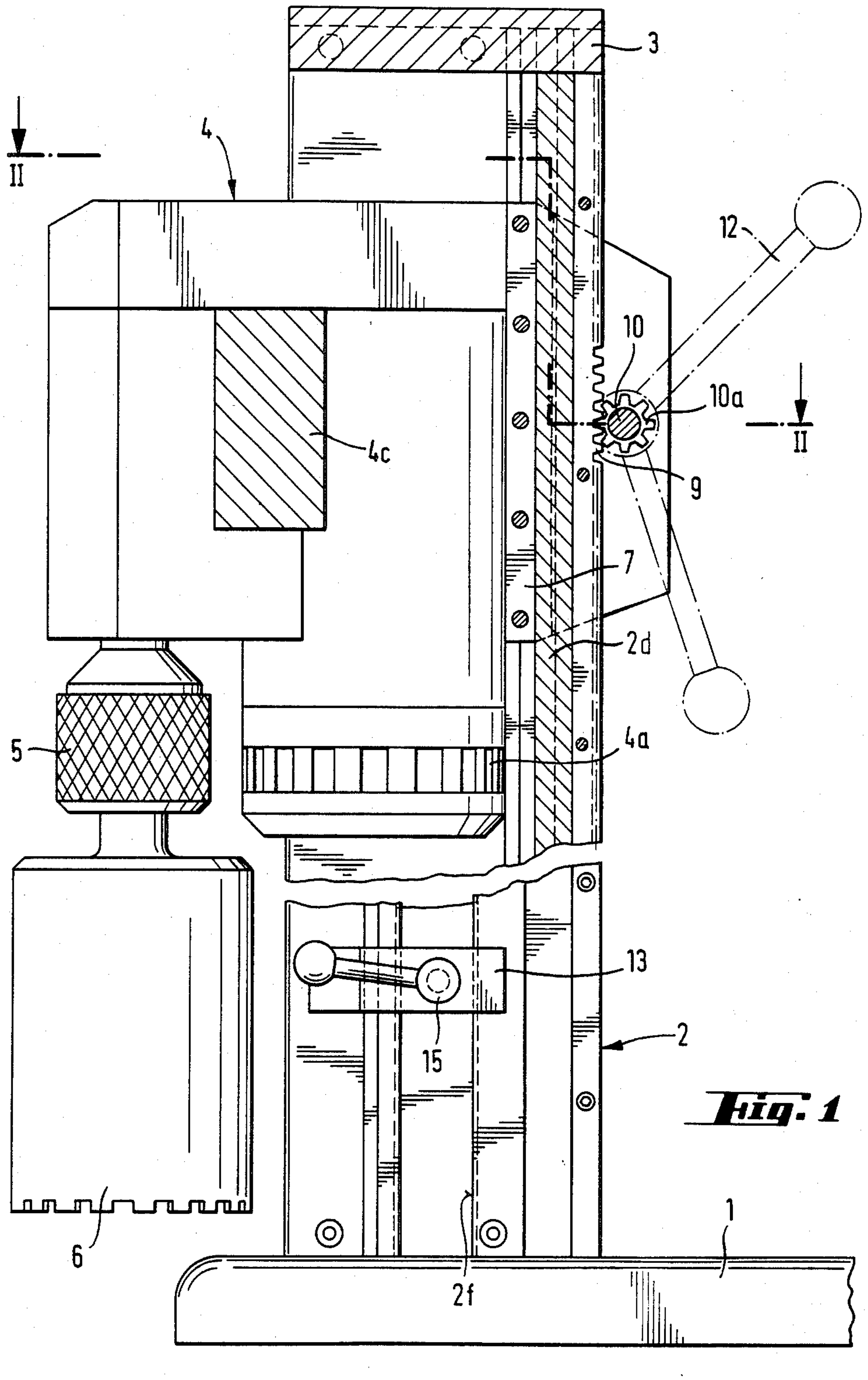
FIG. 1 is an elevational view of a drill stand embodying the present invention, shown in partly in section taken along the line I—I in FIG. 2.
Figure 2:
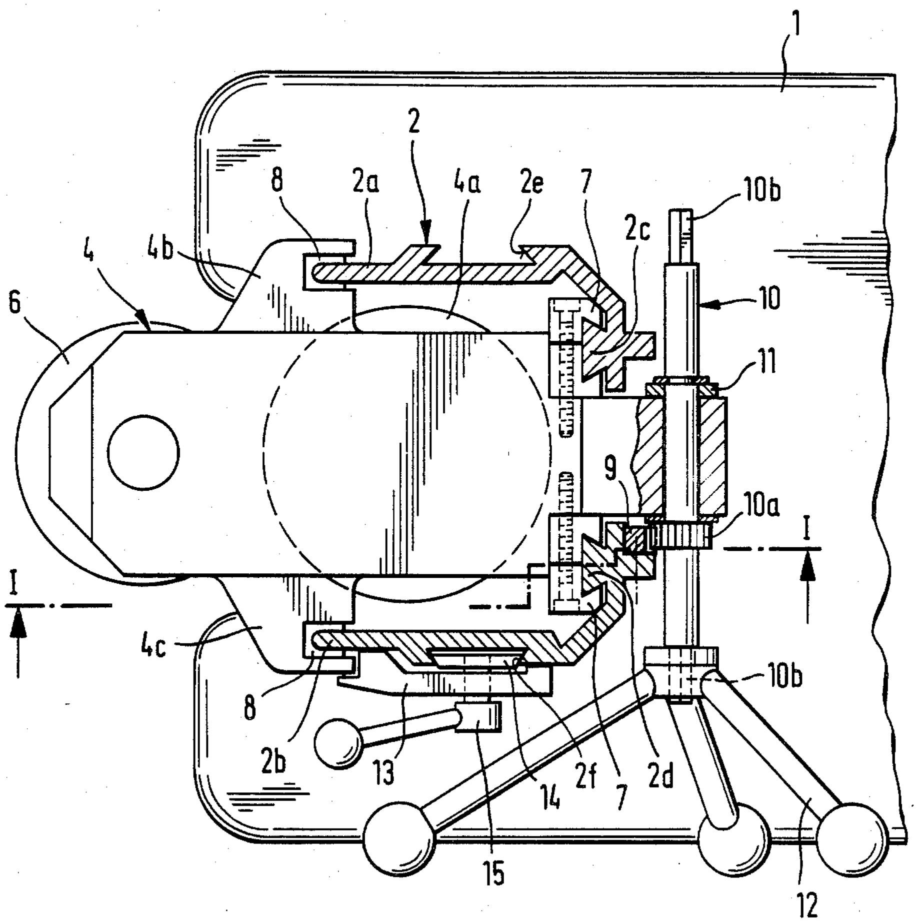
FIG. 2 is a transverse sectional view of the drill stand taken along the line II—II in FIG. 1.

A drilling stand embodying the present invention is illustrated in FIGS. 1 and 2 and includes a base plate 1 having a support plane so that it can bear on a surface to be drilled and an elongated guide column 2 extending transversely of and outwardly from the support plane with one end of the column connected to the base plate. Guide column 2 is formed of two support members 2*a*, 2*b* spaced laterally apart, note FIG. 2, with the support members disposed in parallel relation to one another. At the ends of the support members 2*a*, 2*b* spaced outwardly from the base plate 1, a cover plate 3 extends between and interconnects the support members. A drilling device 4 is movably mounted on the support members 2*a*, 2*b* and is located in the space between the support members. As indicated in FIG. 1, the drilling device 4 includes a tool holder 5 extending downwardly toward the base plate 1 with a drilling tool 6 inserted into the tool holder. The base plate is shaped so that it does not interfere with the downward movement of the drilling tool 6 against the receiving material to be drilled.

As can be seen in FIG. 2, each of the support members 2*a*, 2*b* forming the guide column 2 is L-shaped with the longer leg of each support member extending parallel to the other and being spaced apart so that the drilling device 2 fits between the two longer legs. The two shorter legs of the L-shaped support members project toward one another but are spaced apart so that the drilling device 4 can project outwardly between the two shorter legs on the opposite side of the drilling device from the tool holder 5.

To guide the shorter legs of the support member 2*a*, 2*b* each has an elongated dovetail-shaped strip 2*c*, 2*d* extending in the elongated direction of the column. These strips 2*c*, 2*d* engage within correspondingly shaped recesses or grooves in elements 7. The elements 7 containing the dovetail-shaped grooves are detachably secured to the drilling device 4. If necessary, the elements 7 can be replaced in a quick and simple manner. Drilling device 4 has a drive motor 4*a* and two laterally projecting arms 4*b*, 4*c*. Arms 4*b*, 4*c* are provided with replaceable jaws 8 and the jaws are supported against the edges of the longer legs of the L-shaped support members 2*a*, 2*b* spaced from the shorter legs. An elongated rack 9 is secured to the shorter leg of the support member 2*b*.

Rack 9 serves as the feed drive for the movement of the drilling device 4 in the elongated direction of the guide column 2. For efecting the movement of the drilling device 4, a drive shaft 10 is rotatably mounted in a projection of the drilling device extending outwardly between the two shorter legs of the support members 2*a*, 2*b* on the opposite side of the device from the tool holder 5. A pinion 10*a* is mounted on the drive shaft and is in meshed engagement with the rack 9. To operate the drive shaft 10 it is provided at each of its opposite ends with a polygonal section 10*b*. As shown in FIG. 2, at one end of the drive shaft 10, a handwheel 12 is fitted onto the polygonal section 10*b* and the shaft is secured against any axial displacement by a collar 11 located on the shaft on the opposite side of the drilling device from the pinion 10*a*. Depending on the position of the drilling stand, the handwheel 12 may be positioned on either end of the drive shaft 10. The handwheel 12 affording manual operation can be replaced by a motor.

A stop 13 is secured on one side of the column 2 to limit the drilling depth. Stop 13 can be locked in any position by means of the dovetailed-shaped sliding block 14 guided within a dovetailed-shaped slot 2*e*, 2*f* in the longer legs of the support members 2*a*, 2*b*. A locking lever 15 secures the stop in position within the dovetailed-shaped slot. As shown in FIG. 2 the stop 13 is secured to the supporting member 2*b*, however, it could also be mounted on the other supporting member 2*a* which has a corresponding slot 2*e*. Since both support members 2*a*, 2*b* have the same transverse cross-sectional shape, they can be produced from identically shaped sections. Accordingly, it is possible to produce the support members 2*a*, 2*b* forming the guide column 2 in large lots so that the production of the support members can be carried out economically.

While specific embodiments of the invention have been shown and described in detail to illustrate the application of the inventive principles, it will be understood that the invention may be embodied otherwise without departing from such principles.

We claim:

1. Drilling stand comprising a base plate having a support plane, an elongated guide column connected to said base plate and extending transversely of and outwardly from the support plane thereof, a drilling device including a drilling tool mounted on said guide column and being movable along the elongated direction thereof, guide means in said guide columm, means for moving said drilling device on said guide column, wherein the improvement comprises that said drilling stand is movable for drilling holes at different locations in a stationary hard receiving material, said guide column includes two laterally spaced parallel elongated support members having the same cross-sectional size and shape transversely of the elongated direction thereof, said guide means being formed in each of said support members for guiding said drilling device thereon, said support members laterally enclosing said drilling device, said means for moving said drilling device includes engagement means on one of said support members, said guide means comprises dovetail-shaped strips formed on each said support members, and elements on said drilling device forming correspondingly shaped dovetail-shaped grooves for receiving said dovetail-shaped strips, said support members are L-shaped in transverse section, each said L-shaped support member has a longer leg and a shorter leg with said longer legs disposed in parallel relation and said shorter legs extending from said longer legs toward one another and being disposed in spaced relation, and said elements having dovetail-shaped grooves are detachably secured to said drilling device.

2. Drilling stand, as set forth in claim 1, wherein a cover plate is secured to and interconnects the ends of said support members spaced outwardly from said base plate.

3. Drilling stand, as set forth in claim 1, wherein said means for moving said drilling device includes an elongated rack secured on at least one of said support members, and a feeding mechanism secured to said drilling device and in meshed engagement with said rack.

4. Drilling stand, as set forth in claim 3, wherein said feeding mechanism comprises a drive shaft extending transversely of the elongated direction of said guide column, and a pinion mounted on said drive shaft and in meshed engagement with said rack.

5. Drilling stand, as set forth in claim 1, wherein a stop member is movably secured to said guide column for limiting the depth to which said drilling device can be moved.

6. Drilling stand, as set forth in claim 5, wherein said stop includes a dovetail-shaped block, a dovetail-shaped groove in at least one of said support members for receiving said block, and means for locking said block within said grooves for securing said stop on said guide column.

7. Drilling stand comprising a base plate having a support plane, an elongated guide column connected to said base plate and extending transversely of and perpendicularly outwardly from the support plane thereof, a drilling device including a drilling tool mounted in said guide column and being moveable along the elongated direction thereof, guide means in said guide column, means for moving said drilling device on said guide column, wherein the improvement comprises that said drilling stand is moveable for drilling holes at different locations in a stationary hard receiving material, said guide column includes two laterally spaced parallel elongated support members, said support members each have the same cross-section size and shape transversely of the elongated direction thereof and are L-shaped in the transverse direction, each said L-shaped support member has a longer leg and a shorter leg with said longer legs disposed in parallel relation and said shorter legs extending from said longer legs toward one another and being disposed in spaced relation, a cover plate secured to and interconnecting the ends of said support members spaced outwardly from said base plate, said guide means being formed in each of said shorter legs of said support members for guiding said drilling device thereof, said guide means comprises a dovetail-shaped strip formed on each of the shorter legs of said support members, and elements on said drilling device forming correspondingly shaped dovetail-shaped grooves for receiving said dovetail-shaped strips, said elements are detachably secured to said drilling device, said means for moving said drilling device includes engagement means on one of said support members, said means for moving said drilling device includes an elongated rack secured on the shorter leg of at least one of said support members and a feeding mechanism secured to said drilling device and in meshed engagement with said rack, said feeding mechanism comprises a drive shaft extending transversely of the elongated direction of said guide column, a pinion mounted on said drive shaft and in meshed engagement with said rack.

* * * * *